United States Patent
Tanaka et al.

(10) Patent No.: US 9,655,816 B2
(45) Date of Patent: May 23, 2017

(54) LIQUID PACKAGING CONTAINER

(71) Applicant: KURARAY CO., LTD., Kurashiki-shi (JP)

(72) Inventors: Yusuke Tanaka, Kamisu (JP); Yosuke Jogo, Kamisu (JP); Yusuke Nojima, Kamisu (JP); Shinya Oshita, Kamisu (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/034,749

(22) PCT Filed: Apr. 8, 2015

(86) PCT No.: PCT/JP2015/061030
§ 371 (c)(1),
(2) Date: May 5, 2016

(87) PCT Pub. No.: WO2015/156334
PCT Pub. Date: Oct. 15, 2015

(65) Prior Publication Data
US 2016/0287474 A1 Oct. 6, 2016

(30) Foreign Application Priority Data
Apr. 9, 2014 (JP) ................................. 2014-080560

(51) Int. Cl.
*A61J 1/10* (2006.01)
*A61J 1/14* (2006.01)

(52) U.S. Cl.
CPC ............... *A61J 1/1468* (2015.05); *A61J 1/10* (2013.01)

(58) Field of Classification Search
CPC ....... A61J 1/05; A61J 1/10; Y10T 428/31913; Y10T 428/31917; Y10T 428/31909;
(Continued)

(56) References Cited

U.S. PATENT DOCUMENTS 5,026,778 A * 6/1991 Fujii ........................ C08L 23/12
264/176.1
8,663,797 B2 3/2014 Tanaka et al.
(Continued)

FOREIGN PATENT DOCUMENTS

JP EP 0919368 A2 * 6/1999 ............. B32B 27/32
JP 2002-011839 A 1/2002
(Continued)

OTHER PUBLICATIONS

Mitsui Chemical Co. TAFMER A-4085S Ethylene Based Elastomer product datasheet, https://web.archive.org/web/20131204174851/ http://www.mitsuichem.com/special/tafmer/grades/pdf/tds_c_A-4085S.pdf Dec. 4, 2013, p. 1.*
(Continued)

*Primary Examiner* — Lee E Sanderson
(74) *Attorney, Agent, or Firm* — Oblon, McClelland, Maier & Neustadt, L.L.P.

(57) ABSTRACT

Provided is a liquid packaging container having satisfactory flexibility and transparency, high heat-seal strength, high bag-breaking strength at normal temperature and low temperatures, and low (inner layer)-(inner layer) adhesiveness, which are properties important for liquid packaging containers for medical use. Specifically, provided is a liquid packaging container formed from a laminate of at least three layers including an inner layer formed from a resin composition (Y) as described below, an intermediate layer, and an outer layer formed from a resin composition (Z) as described below, the intermediate layer being formed from a resin composition (X) as described below:

resin composition (X): a resin composition including 100 parts by mass of a polypropylene-based resin (1), 5 parts by mass to 95 parts by mass of a particular thermoplastic elastomer (2), and 10 parts by mass to 95 parts by mass of a particular ethylene-α-olefin copolymer (3);

(Continued)

resin composition (Y): a resin composition including 100 parts by mass of a polypropylene-based resin (1'), and 5 parts by mass to 250 parts by mass of a particular thermoplastic elastomer (2') (provided that a particular ethylene-α-olefin copolymer is not included or, if included, the content of the copolymer is less than 10 parts by mass); and resin composition (Z): a resin composition including 100 parts by mass of a polypropylene-based resin (1"), and 0 parts by mass to 35 parts by mass of a particular thermoplastic elastomer (2").

8 Claims, 1 Drawing Sheet

(58) Field of Classification Search
CPC ......... Y10T 428/1386; Y10T 428/1352; Y10T 428/1334
USPC ........ 525/88, 89, 96, 98, 99; 428/35.7, 34.3, 428/35.8, 35.9, 36.92, 515, 516, 519, 523, 428/35.2, 36.8
See application file for complete search history.

(56) References Cited

U.S. PATENT DOCUMENTS

| | | |
|---|---|---|
| 2003/0124370 A1 | 7/2003 | Suzuki et al. |
| 2003/0232212 A1* | 12/2003 | Chundury ............... B32B 27/08 428/515 |
| 2005/0147779 A1 | 7/2005 | Ahr et al. |
| 2010/0074562 A1 | 3/2010 | Nanba et al. |
| 2010/0152386 A1* | 6/2010 | Miwa ....................... C08F 8/04 525/98 |
| 2014/0072576 A1 | 3/2014 | Kokubo et al. |
| 2015/0004476 A1 | 1/2015 | Ito et al. |

FOREIGN PATENT DOCUMENTS

| | | |
|---|---|---|
| JP | 2003-191405 A | 7/2003 |
| JP | 2009-149861 A | 7/2009 |
| JP | 2011-093209 A | 5/2011 |
| KR | 10-1344985 B1 | 12/2013 |
| TW | 201347994 A | 12/2013 |
| WO | WO2009/082132 | 7/2009 |

OTHER PUBLICATIONS

MatWeb Material Property Data, Total PPR Z9450 Random Copolymer, http://www.matweb.com/search/datasheettext.aspx?matguid=ebc73a8cbd724cefb86c91c56664726e, Accessed Aug. 23, 2016, p. 1.*

Combined Taiwanese Office Action and Search Report issued on Jun. 21, 2016 in Patent Application No. 104111433 (with English language translation of categories of cited documents).

International Search Report issued on Jun. 30, 2015 for PCT/JP2015/061030 filed on Apr. 8, 2015.

Supplementary European Search Report mailed Feb. 21, 2017 in 15777213.8.

* cited by examiner

CRACK PROPAGATION MODE A    CRACK PROPAGATION MODE B

CRACK PROPAGATION MODE A

CRACK PROPAGATION MODE B

LIQUID PACKAGING CONTAINER

TECHNICAL FIELD

The present invention relates to a liquid packaging container.

BACKGROUND ART

In regard to liquid packaging containers for medical use, for example, infusion solution bags, bags made of glass or bags made of plastic have been used. The liquid medicine injected into the infusion solution bag is sealed, and then is generally sterilized according to methods such as steam sterilization and autoclave sterilization. Since infusion solution bags made of glass have a problem that these bags are heavier than the bags made of plastic and are susceptible to damage when subjected to impact, dropping or the like at the time of transportation, infusion solution bags made of plastic are widely used.

Regarding the infusion solution bags made of plastic, a bag made of a soft vinyl chloride resin, or a bag made of a polyolefin such as polyethylene or polypropylene is used. Since an infusion solution bag made of a soft vinyl chloride resin contains a large amount of a plasticizer in order to impart flexibility to the bag, there is a risk that depending on the kind of the infusion solution, the plasticizer may be eluted out into the infusion solution, and this has been pointed out with regard to the aspect of safety. Furthermore, since medical instruments are disposable, infusion solution bags made of a soft vinyl chloride resin are also incinerated after use. However, there is a problem that toxic gases attributable to the soft vinyl chloride resin are generated. Furthermore, infusion solution bags made of a polyolefin such as polyethylene or polypropylene do not contain plasticizers, and therefore, these bags are preferable with regard to the aspect of hygiene. However, since these infusion solution bags have low flexibility and insufficient impact resistance, it cannot be said that the bags are satisfactory in view of handleability.

On the other hand, for the purpose of improving flexibility, sealability and blocking resistance, a multilayer film for medical use, which uses a polypropylene-based resin composition including 50% by mass to 98% by mass of a crystalline polypropylene-based resin, 1% by mass to 49% by mass of a particular ethylene-α-olefin copolymer, and 1% by mass to 49% by mass of a particular hydrogenated block copolymer as a seal layer (inner layer), has been proposed (see PTL 1).

CITATION LIST

Patent Literature

[PTL 1] JP-A-2009-149861

SUMMARY OF INVENTION

Technical Problem

It has been disclosed that the multilayer film described in PTL 1 can be used for medical containers. In the Examples of PTL 1, the content of the ethylene-α-olefin copolymer was uniformly adjusted to 5% by mass or less. However, according to a further investigation made by the inventors of the present invention, it was found that in a case in which a polypropylene-based resin composition having the content of the ethylene-α-olefin copolymer adjusted to this level is used as the material for an intermediate layer for a medical container such as an infusion solution bag, the liquid packaging container becomes susceptible to damage when subjected to impact, dropping or the like, due to the mechanism that will be described below.

Furthermore, since a medical container such as an infusion solution bag is produced by superposing multilayer films and then heat sealing the circumference of the films, it is required that the inner layer that is brought into contact with an infusion solution has high heat-seal strength. On the other hand, since it is necessary to prevent the inner layers from adhering to each other and making it difficult to inject an infusion solution therein, selection of the material for the inner layer that is combined with an intermediate layer is also important. Meanwhile, according to a further investigation made by the inventors of the present invention, it was found that the materials for the seal layer (inner layer) used in the Examples of PTL 1 have a high risk of (inner layer)-(inner layer) adhesion.

Thus, it is an object of the present invention to provide a liquid packaging container having satisfactory flexibility and transparency, high heat-seal strength, high bag-breaking strength at low temperatures (for example, about −10° C. to 10° C.) and normal temperature for example, about 15° C. to 30° C.), and low (inner layer)-(inner layer) adhesiveness, which are important properties for a liquid packaging container for medical use.

Solution to Problem

The inventors of the present invention conducted a thorough investigation, and as a result, the inventors found that when a liquid packaging container formed from a laminate of at least three layers including an inner layer, an intermediate layer and an outer layer, with only the intermediate layer being formed from a particular resin composition (X) described below, is used, the (inner layer)-(inner layer) adhesion can be reduced, while the way by which cracks occurring due to impact, dropping or the like develop can be controlled, and consequently, high bag-breaking strength can be obtained at low temperatures and normal temperature, so that the problems described above can be solved. Thus, the inventors completed the present invention.

The invention relates to the following [1] to [8].

[1] A liquid packaging container formed from a laminate of at least three layers including an inner layer formed from a resin composition (Y) as described below, an intermediate layer, and an outer layer formed from a resin composition (Z) as described below, the intermediate layer being formed from a resin composition (X) as described below, resin composition (X): a resin composition including 100 parts by mass of a polypropylene-based resin (1) having a content of a structural unit derived from a propylene monomer of 60 mol % or more 5 parts by mass to 95 parts by mass of a thermoplastic elastomer (2) having a number average molecular weight of 20,000 to 500,000, the thermoplastic elastomer (2) being a thermoplastic elastomer obtained by hydrogenating a block copolymer containing a polymer block (A) which contains a structural unit derived from an aromatic vinyl compound as a main component and has a number average molecular weight of 2,500 to 100,000, and a polymer block (B) which contains a structural unit derived from a conjugated diene compound as a main component and has a content of a vinyl bond structural unit of 50 mol % or more and a number average molecular weight of 10,000 to 300,000, the polymer block (B) having 80 mol % or more of the carbon-carbon double bonds hydrogenated; and 10 parts by mass to 95 parts by mass of an ethylene-α,-olefin copolymer (3) having a content of a structural unit derived from an ethylene monomer of 50 mol % to 95 mol %, resin composition (Y): a resin composition including 100 parts by mass of a polypropylene-based resin (1') having a content of a structural unit derived from a propylene monomer of 60 mol % or more; and 5 parts by mass to 250 parts by mass of a thermoplastic elastomer (2') having a polymer block which contains a structural unit derived from an aromatic vinyl compound as a main component and a polymer block which contains a structural unit derived from a conjugated diene compound as a main component (provided that an ethylene-α-olefin copolymer having a content of a structural unit derived from an ethylene monomer of 50 mol % to 95 mol % is not included in the resin composition or, if included, the content of the copolymer is less than 10 parts by mass), and resin composition (Z): a resin composition including 100 parts by mass of a polypropylene-based resin (1") having a content of a structural unit derived from a propylene monomer of 60 mol % or more and 0 parts by mass to 35 parts by mass of a thermoplastic elastomer (2") having a polymer block which contains a structural unit derived from an aromatic vinyl compound as a main component and a polymer block which contains a structural unit derived from a conjugated diene compound as a main component.

[2] The liquid packaging container according to [1], wherein the ethylene-α-olefin copolymer (3) has a melt flow rate of 0.1 g/10 min to 30 g/10 min under the conditions of 230° C. and a load of 21.6 N, and a melting point of 40° C. to 120° C.

[3] The liquid packaging container according to [1] or [2], wherein the polypropylene-based resins (1), (1') and (1") are each independently at least one selected from homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, and a propylene-ethylene-hexene random copolymer.

[4] The liquid packaging container according to any one of [1] to [3], wherein the polypropylene-based resin (1') has a melting point of 120° C. to 140° C.

[5] The liquid packaging container according to any one of [1] to [4], wherein the polypropylene-based resin (1") is homopolypropylene. [6] The liquid packaging container according to any one of [1] to [5], wherein the thermoplastic elastomers (2') and (2") are each independently a thermoplastic elastomer obtained by hydrogenating a block copolymer having a polymer block (A) which contains a structural unit derived from an aromatic vinyl compound as a main component and has a number average molecular weight of 2,500 to 100,000, and a polymer block (B) which contains a structural unit derived from a conjugated diene compound as a main component and has a content of a vinyl bond structural unit of 50 mol % or more and a number average molecular weight of 10,000 to 300,000, 80 mol % or more of the carbon-carbon double bonds of the polymer block (B) are hydrogenated, and the number average molecular weight of the thermoplastic elastomer is 20,000 to 500,000.

[7] The liquid packaging container according to any one of [1] to [6], wherein the thicknesses of the respective layers are in the ranges of 5 μm to 30 μm for the inner layer, 100 μm to 300 μm for the intermediate layer, and 15 μm to 120 μm for the outer layer.

[8] A medical container having the liquid packaging container according to any one of [1] to [7].

Advantageous Effects of Invention

According to the present invention, a liquid packaging container having satisfactory flexibility and transparency, high heat-seal strength, high bag-breaking strength at low temperatures and normal temperature, and low (inner layer)-(inner layer) adhesiveness, can be provided. By having these characteristics, the liquid packaging container of the present invention can be used particularly suitably for medical applications.

DESCRIPTION OF EMBODIMENTS

Figure 1:
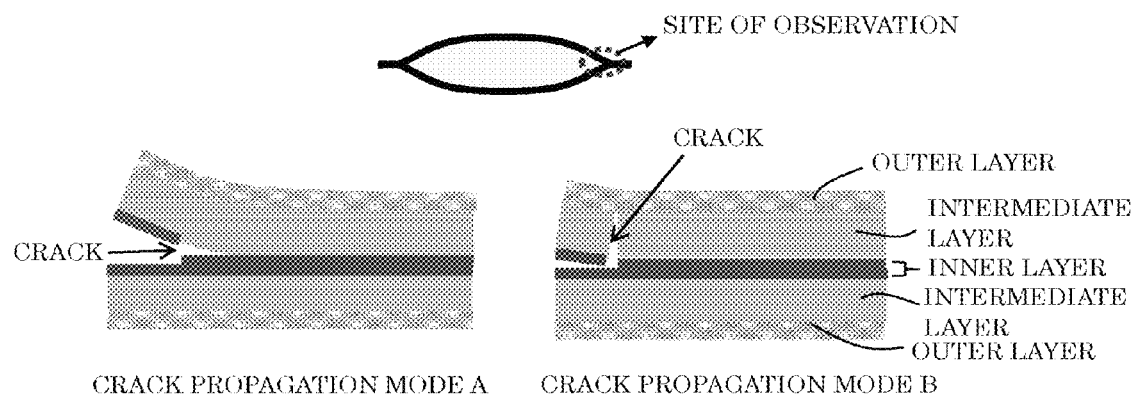
FIG. 1 is a schematic diagram illustrating the observation site for crack propagation mode and the crack propagation mode of liquid packaging containers in Examples and Comparative Examples.

According to the present specification, a definition that is said to be preferable can be arbitrarily selected, and a combination of preferable definitions can be said to be more preferable.

[Liquid Packaging Container]

The present invention is a liquid packaging container formed from a laminate of at least three layers including an inner layer formed from a resin composition (Y) as described below, an intermediate layer, and an outer layer formed from a resin composition (Z) as described below, the intermediate layer being formed from a resin composition (X) as described below.

(Resin Composition (X))

A resin composition including 100 parts by mass of a polypropylene-based resin (1) having a content of a structural unit derived from a propylene monomer of 60 mol % or more 5 parts by mass to 95 parts by mass of a thermoplastic elastomer (2) having a number average molecular weight of 20,000 to 500,000, the thermoplastic elastomer (2) being a thermoplastic elastomer obtained by hydrogenating a block copolymer having a polymer block (A) which contains a structural unit derived from an aromatic vinyl compound as a main component and has a number average molecular weight of 2,500 to 100,000, and a polymer block (B) which has a structural unit derived from a conjugated diene compound as a main component and has a content of a vinyl bond structural unit of 50 mol % or more and a number average molecular weight of 10,000 to 300,000, the polymer block (B) having 80 mol % or more of the carbon-carbon double bonds hydrogenated; and 10 parts by mass to 95 parts by mass of an ethylene-α-olefin copolymer (3) having a content of a structural unit derived from an ethylene monomer of 50 mol % to 95 mol %.

(Resin Composition (Y))

A resin composition including 100 parts by mass of a polypropylene-based resin (1') having a content of a structural unit derived from a propylene monomer of 60 mol % or more; and 5 parts by mass to 250 parts by mass of a thermoplastic elastomer (2') having a polymer block which contains a structural unit derived from an aromatic vinyl compound as a main component and a polymer block which has a structural unit derived from a conjugated diene compound as a main component (provided that an ethylene-α-olefin copolymer having a content of a structural unit derived from an ethylene monomer of 50 mol % to 95 mol % is not included in the resin composition or, if included, the content of the copolymer is less than 10 parts by mass).

(Resin Composition (Z))

A resin composition including 100 parts by mass of a polypropylene-based resin (1″) having a content of a structural unit derived from a propylene monomer of 60 mol % or more; and 0 parts by mass to 35 parts by mass of a thermoplastic elastomer (2″) having a polymer block which contains a structural unit derived from an aromatic vinyl compound as a main component and a polymer block which has a structural unit derived from a conjugated diene compound as a main component.

When a liquid packaging container has an intermediate layer formed from the resin composition (X) between the inner layer and the outer layer, the liquid packaging container becomes a liquid packaging container having satisfactory flexibility and transparency, high heat-seal strength, high bag-breaking strength at low temperatures and normal temperature, and low (inner layer)-(inner layer) adhesiveness.

In the following, each of the components of the resin composition (X) that is used for the intermediate layer will be first explained in detail.

[Polypropylene-Based Resin (1)]

The polypropylene-based resin (1) used in the resin composition (X) is not particularly limited as long as the content of a structural unit derived from a propylene monomer (hereinafter, may be simply referred to as propylene content) is 60 mol % or more, and any known polypropylene-based resin can be used. The content of the structural unit derived from a propylene monomer is preferably 80 mol % or more, more preferably 80 mol % to 100 mol %, even more preferably 90 mol % to 100 mol %, and particularly preferably 95 mol % to 99 mol %. Examples of the structural unit derived from a monomer other than a propylene monomer include a structural unit derived from an ethylene monomer; structural units derived from α-olefin monomers such as 1-butene, 1-hexene, 1-heptene, 1-octene, 4-methyl-1-pentene, 1-nonene, and 1-decene; and structural units derived from the modifying agents that will be described below.

Examples of the polypropylene-based resin (1) include homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, a propylene-ethylene-hexene random copolymer, and modification products thereof. Examples of the modification products include a product obtainable by graft copolymerizing a modifying agent to a polypropylene-based resin; and a product obtainable by copolymerizing a modifying agent to the main chain of a polypropylene-based resin. Examples of the modifying agent include unsaturated dicarboxylic acids such as maleic acid, citraconic acid, halogenated maleic acid, itaconic acid, cis-4-cyclohexene-1,2-dicarboxylic acid, and endo-cis-bicyclo[2.2.1]-5-heptene-2,3-dicarboxylic acid; esters, amides or imides of unsaturated dicarboxylic acids; unsaturated dicarboxylic acid anhydrides such as maleic anhydride, citraconic anhydride, halogenated maleic anhydride, itaconic anhydride, cis-4-cyclohexene-1,2-dicarboxylic acid anhydride, and endo-cis-bicyclo[2.2.1]-5-heptene-2,3-dicarboxylic acid anhydride; unsaturated monocarboxylic acids such as acrylic acid, methacrylic acid, and crotonic acid; and esters of unsaturated monocarboxylic acids (methyl acrylate, ethyl acrylate, methyl methacrylate, ethyl methacrylate, and the like), amides or imides of unsaturated monocarboxylic acids. The polypropylene-based resin (1) is preferably an unmodified polypropylene-based resin.

Among them, from the viewpoint of being easily available at relatively low cost, homopolypropylene, a propylene-ethylene random copolymer, and a propylene-ethylene block copolymer are preferred; homopolypropylene and a propylene-ethylene random copolymer are more preferred; and a propylene-ethylene random copolymer is even more preferred.

The polypropylene-based resins (1) may be used singly or in combination of two or more kinds thereof.

The melt flow rate (MFR) of the polypropylene-based resin (1) measured under the conditions of 230° C. and 21.6 N is preferably 0.1 g/10 min to 30 g/10 min, more preferably 1 g/10 min to 20 g/10 min, and even more preferably 1 g/10 min to 10 g/10 min, from the viewpoint of the molding processability of the resin composition (X). Meanwhile, all of the "melt flow rates" described in the present specification and the claims are values measured according to JIS K 7210.

Furthermore, the melting point of the polypropylene-based resin (1) is not particularly limited, but the melting point is preferably 120° C. to 180° C., more preferably 120° C. to 170° C., and even more preferably 140° C. to 170° C. Meanwhile, all of the "melting points" described in the present specification and the claims are values measured according to the method described in the Examples.

[Particular Thermoplastic Elastomer (2)]

The particular thermoplastic elastomer (2) used in the resin composition (X) is a thermoplastic elastomer having a number average molecular weight of 20,000 to 500,000, the thermoplastic elastomer (2) being a thermoplastic elastomer obtained by hydrogenating a block copolymer having a polymer block (A) which contains a structural unit derived from an aromatic vinyl compound as a main component and has a number average molecular weight of 2,500 to 100,000, and a polymer block (B) which contains a structural unit derived from a conjugated diene compound as a main component and has a content of a vinyl bond structural unit (hereinafter, also referred to as content of vinyl bonds) of 50 mol % or more and a number average molecular weight of 10,000 to 300,000, the polymer block (B) having 80 mol % or more of the carbon-carbon double bonds hydrogenated.

Hereinafter, the polymer block (A) and the polymer block (B) will be explained in sequence.

(Polymer Block (A))

The polymer block (A) contains a structural unit derived from an aromatic vinyl compound as a main component. The phrase "contains . . . as a main component" as used herein means that the polymer block (A) contains a structural unit derived from an aromatic vinyl compound at a proportion of 50% by mass or more based on the total mass of the polymer block (A). The content of the structural unit derived from an aromatic vinyl compound in the polymer block (A) is more preferably 70% by mass or more, and even more preferably 90% by mass or more, based on the total mass of the polymer block (A), from the viewpoints of the transparency and mechanical characteristics of the resin composition (X).

Examples of the aromatic vinyl compound include styrene, o-methylstyrene, m-methylstyrene, p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-t-butylstyrene, m-t-butylstyrene, p-t-butylstyrene, o-methoxystyrene, m-methoxystyrene, p-methoxystyrene, o-chloromethylstyrene, m-chloromethylstyrene, p-chloromethylstyrene, o-bromomethylstyrene, m-bromomethylstyrene, p-bromomethylstyrene, a styrene derivative substituted with a silyl group, indene, and vinylnaphthalene. Among them, from the viewpoints of the production cost and the balance between physical properties, styrene, α-methylstyrene and a mixture thereof are preferred, and styrene is more preferred.

However, as long as the purpose and the effects of the present invention are not impaired, the polymer block (A) may contain a structural unit derived from another unsaturated monomer in addition to the aromatic vinyl compound. The other unsaturated monomer may be, for example, at least one selected from butadiene, isoprene, 2,3-dimethyl-1,3-butadiene, 1,3-pentadiene, 1,3-hexadiene, isobutylene, styrene, o-methylstyrene, m-methylstyrene, p-methylstyrene, p-t-butylstyrene, 2,4-dimethylstyrene, vinylnaphthalene, vinylanthracene, methyl methacrylate, methyl vinyl ether, N-vinylcarbazole, β-pinene, 8,9-p-menthene, dipentene, methylenenorbornene, and 2-methylenetetrahydrofuran. The bonding form in a case in which the polymer block (A) contains a structural unit derived from the other unsaturated monomer is not particularly limited, and the bonding form may be any of a random form or a tapered form.

In a case in which the polymer block (A) contains a structural unit derived from another unsaturated monomer in addition to the aromatic vinyl compound, the content of the structural unit is preferably 10% by mass or less based on the total mass of the polymer block (A).

The number average molecular weight of the polymer block (A) is 2,500 to 100,000, preferably 2,500 to 50,000, and more preferably 3,000 to 30,000. Meanwhile, all of the "number average molecular weights" described in the present specification and the claims are number average molecular weights determined by an analysis by gel permeation chromatography (GPC) and calculated relative to polystyrene standards, and more particularly, the number average molecular weights are values measured according to the method described in the Examples.

Furthermore, the content of the polymer block (A) is preferably 5% by mass to 40% by mass, more preferably 7% by mass to 35% by mass, even more preferably 10% by mass to 35% by mass, particularly preferably 10% by mass to 27% by mass, and most preferably 10% by mass to 25% by mass, from the viewpoints of the rubber elasticity and flexibility of the layer formed from the resin composition (X). Meanwhile, the content of the polymer block (A) in the thermoplastic elastomer (2) is a value determined from the $^1$H-NMR spectrum, and more particularly, the content is a value measured according to the method described in the Examples.

(Polymer Block (B))

The polymer block (B) contains a structural unit derived from a conjugated diene compound as a main component. The phrase "contains . . . as a main component" as used herein means that the polymer block (B) contains a structural unit derived from a conjugated diene compound at a proportion of 50% by mass or more based on the total mass of the polymer block. The content of the structural unit derived from a conjugated diene compound in the polymer block (B) is more preferably 70% by mass or more, and even more preferably 90% by mass or more, based on the total mass of the polymer block (B).

The conjugated diene compound that constitutes the polymer block (B) may be, for example, at least one selected from butadiene, isoprene, 2,3-dimethyl-1,3-butadiene, 1,3-pentadiene, and 1,3-hexadiene. Among them, butadiene, isoprene, and a mixture of butadiene and isoprene are preferred.

Furthermore, in a case in which the polymer block (B) is composed of two or more kinds of structural units derived from conjugated diene compounds (for example, butadiene and isoprene), the bonding form thereof is not particularly limited, and the bonding form may be a random form, a tapered form, a perfect alternating form, a partial block form, a block form, or a combination of two or more kinds thereof.

The number average molecular weight of the polymer block (B) is 10,000 to 300,000, preferably 20,000 to 270,000, more preferably 40,000 to 240,000, even more preferably 75,000 to 240,000, and particularly preferably 85,000 to 220,000, from the viewpoint of the flexibility of the resin composition (X).

In regard to the polymer block (B), the content of the vinyl bond structural unit (for example, in the case of a butadiene monomer, the vinyl bond structural unit is a 1,2-bond structural unit, and in the case of an isoprene monomer, the vinyl bond structural unit is the sum of a 1,2-bond structural unit and a 3,4-bond structural unit) is 50 mol % or more. The content of the vinyl bond structural unit is preferably 50 mol % to 90 mol %, and more preferably 50 mol % to 80 mol %.

From the viewpoints of heat resistance and weather resistance, 80 mol % or more of the carbon-carbon double bonds contained in the polymer block (B) have been hydrogenated (hereinafter, may be referred to as hydrogenated), and it is preferable that 85 mol % or more of the bonds have been hydrogenated, while it is more preferable that 90 mol % or more of the bonds have been hydrogenated. Meanwhile, this value may be referred to as a hydrogenation ratio. The upper limit of the hydrogenation ratio is not particularly limited; however, the upper limit may be 99 mol %, may be 98 mol %, or may be 95 mol %.

Meanwhile, the hydrogenation ratio described above is a value obtained by calculating the content of the carbon-carbon double bonds in the structural unit derived from a conjugated diene compound in the polymer block (B), using the $^1$H-NMR spectrum before and after the hydrogenation, and more particularly, the hydrogenation ratio is a value measured according to the method described in the Examples.

Furthermore, as long as the purpose and the effects of the present invention are not impaired, the polymer block (B) may contain a structural unit derived from another polymerizable monomer in addition to the conjugated diene compound. The other polymerizable monomer is preferably, for example, at least one compound selected from aromatic vinyl compounds such as styrene, α-methylstyrene, o-methylstyrene, m-methylstyrene, p-methylstyrene, p-t-butylstyrene, 2,4-dimethylstyrene, vinylnaphthalene, and vinylanthracene; methyl methacrylate; methyl vinyl ether; N-vinylcarbazole; β-pinene; 8,9-p-menthene; dipentene; methylenenorbornene; and 2-methylenetetrahydrofuran. In a case in which the polymer block (B) contains a structural unit derived from a monomer of another polymer in addition to the conjugated diene compound, the bonding form is not particularly limited, and the bonding form may be any of a random form or a tapered form.

In a case in which the polymer block (B) contains a structural unit derived from another polymerizable monomer in addition to the conjugated diene compound, the content of the structural unit is preferably 30% by mass or less, and more preferably 10% by mass or less, based on the total mass of the polymer block (B).

(Bonding Mode Of Polymer Block (A) and Polymer Block (B))

The bonding format of the thermoplastic elastomer (2) is not limited as long as the polymer block (A) and the polymer block (B) are bonded, and the bonding format may be any of a linear mode, a branched mode, a radial mode, or a bonding mode combining two or more thereof. Among them, the bonding format of the polymer block (A) and the polymer block (B) is preferably a linear form, and examples thereof include, when the polymer block (A) is represented by A and the polymer block (B) is represented by B, a triblock copolymer represented by A-B-A, a tetrablock copolymer represented by A-B-A-B, a pentablock copolymer represented by A-B-A-B-A, and an (A-B)nX-type copolymer (wherein X represents a residue of a coupling agent, and n represents an integer of 3 or more). Among them, a triblock copolymer (A-B-A) is preferably used from the viewpoints of the ease of production of a thermoplastic elastomer, flexibility and the like.

Here, according to the present specification, in a case in which polymer blocks of the same kind are bonded in a linear form through a bifunctional coupling agent or the like, the entirety of the polymer blocks that are bonded is considered as one polymer block. Accordingly, a polymer block that should be originally described as Y-X-Y (wherein X represents a residue of a coupling agent) in a strict sense, including the example described above, is generally indicated as Y, except for the case in which it is necessary to distinguish the relevant polymer block from a single polymer block Y. According to the present specification, since a polymer block of this kind containing a residue of a coupling agent is considered as described above, for example, a block copolymer that should be described as A-B-X-B-A (wherein X represents a residue of a coupling agent) in a strict sense, including a residue of a coupling agent, is described as A-B-A and is considered as an example of a triblock copolymer.

Furthermore, the thermoplastic elastomer (2) may also contain a polymer block (C) composed of another polymerizable monomer, in addition to the polymer block (A) and the polymer block (B), to the extent that the purpose of the invention is not impaired. In this case, when the polymer block (C) is represented by C, examples of the structure of the block copolymer include an A-B-C type triblock copolymer, an A-B-C-A type tetrablock copolymer, and an A-B-A-C type tetrablock copolymer.

The number average molecular weight of the thermoplastic elastomer (2) is 20,000 to 500,000, preferably 35,000 to 400,000, more preferably 40,000 to 300,000, and even more preferably 40,000 to 200,000. In a case in which the number average molecular weight of the thermoplastic elastomer (2) is less than 20,000, heat resistance of the resin composition (X) is decreased, and in a case in which the number average molecular weight is more than 500,000, the resin composition (X) has insufficient molding processability.

Furthermore, the molecular weight distribution (Mw/Mn) of the thermoplastic elastomer (2) is not particularly limited; however, from the viewpoint of the mechanical strength of the resin composition thus obtainable, the molecular weight distribution is preferably 1.0 to 1.4, more preferably 1.0 to 1.2, even more preferably 1.00 to 1.10, and most preferably 1.00 to 1.05. Meanwhile, the molecular weight distribution (Mw/Mn) is a value measured according to the method described in the Examples.

The thermoplastic elastomer (2) may have one kind or two or more kinds of functional groups such as a carboxyl group, a hydroxyl group, an acid anhydride group, an amino group and an epoxy group, in the molecular chain and/or at the molecule ends, as long as the purpose and the effects of the invention are not impaired.

In regard to the flowability of the thermoplastic elastomer (2), from the viewpoint of enhancing the molding processability of the resin composition (X), the melt flow rate measured at 230° C. and 21.6 N is preferably 0.1 g/10 min to 80 g/10 min, and more preferably 5 g/10 min to 50 g/10 min.

(Method for Producing Thermoplastic Elastomer (2))

The thermoplastic elastomer (2) can be produced by a solution polymerization method, an emulsion polymerization method, a solid state polymerization method, or the like. Among them, a solution polymerization method is preferred, and for example, any known method such as an ionic polymerization method such as anionic polymerization or cationic polymerization, or a radical polymerization method, can be applied. Among them, an anionic polymerization method is preferred. In an anionic polymerization method, the thermoplastic elastomer (2) can be obtained by introducing an aromatic vinyl compound and a conjugated diene compound in sequence, in the presence of a solvent, an anionic polymerization initiator, and if necessary, a Lewis base, thereby obtaining a block copolymer, and subsequently hydrogenating the block copolymer.

Examples of an organic lithium compound that is used as a polymerization initiator in the method described above include monolithium compounds such as methyllithium, ethyllithium, pentyllithium, n-butyllithium, sec-butyllithium, and tert-butyllithium; and dilithium compounds such as tetraethylenedilithium.

The solvent is not particularly limited as long as the solvent does not adversely affect the anionic polymerization reaction, and examples thereof include aliphatic hydrocarbons such as cyclohexane, methylcyclohexane, n-hexane, and n-pentane; and aromatic hydrocarbons such as benzene, toluene, and xylene. Furthermore, the polymerization reaction is usually carried out at 0° C. to 100° C. for 0.5 hours to 50 hours.

The Lewis base plays the role of controlling the microstructure in a structural unit derived from a conjugated diene compound. Examples of such a Lewis base include dimethyl ether, diethyl ether, tetrahydrofuran, dioxane, ethylene glycol dimethyl ether, pyridine, N,N,N',N'-tetramethylethylenediamine, trimethylamine, and N-methylmorpholine. The Lewis bases may be used singly or in combination of two or more kinds thereof.

After polymerization is carried out by the method described above, an active hydrogen compound such as an alcohol, a carboxylic acid or water is added thereto to terminate the polymerization reaction, and the polymerization product can be converted to a hydrogenation product by hydrogenating the polymerization product according to a known method in the presence of a hydrogenation catalyst in an inert organic solvent. As described above, according to the present invention, a block copolymer in which 80 mol % or more of the carbon-carbon double bonds of the polymer block (B) have been hydrogenated is used.

The hydrogenation reaction can be carried out in the presence of a hydrogenation catalyst under the conditions of a reaction temperature of 20° C. to 100° C. and a hydrogen pressure of 0.1 MPa to 10 MPa.

Examples of the hydrogenation catalyst include Raney nickel; heterogeneous catalysts in which a metal such as platinum (Pt), palladium (Pd), ruthenium (Ru), rhodium (Rh), or nickel (Ni) is supported on a carrier such as carbon, alumina, or diatomaceous earth; Ziegler type catalysts including combinations of an organometallic compound formed from a Group 8 metal such as nickel or cobalt, and an organoaluminum compound such as triethylaluminum or triisobutylaluminum, or an organolithium compound; and metallocene-based catalysts including combinations of a bis(cyclopentadienyl) compound of a transition metal such as titanium, zirconium or hafnium, and an organometallic compound of lithium, sodium, potassium, aluminum, zinc or magnesium.

The thermoplastic elastomer (2) obtained as described above can be obtained by solidifying the polymerization reaction liquid by pouring the reaction liquid into methanol or the like, subsequently subjecting the solid product to heating or drying under reduced pressure; or by pouring the polymerization reaction liquid into boiling water or the like, subjecting the polymerization reaction liquid to so-called steam stripping, by which the solvent is removed by azeotropically boiling the mixture, and then subjecting the resultant to heating or drying under reduced pressure.

[Ethylene-α-olefin Copolymer (3)]

The ethylene-α-olefin copolymer (3) used in the resin composition (X) is not particularly limited as long as the content of a structural unit derived from an ethylene monomer (hereinafter, may be simply referred to as ethylene content) is 50 mol % to 95 mol %, and any known ethylene-α-olefin copolymer can be used.

Examples of the ethylene-α-olefin copolymer (3) include an ethylene-propylene copolymer, an ethylene-1-butene copolymer, an ethylene-1-hexene copolymer, an ethylene-1-heptene copolymer, an ethylene-1-octene copolymer, an ethylene-4-methyl-1-pentene copolymer, an ethylene-1-nonene copolymer, an ethylene-1-decene copolymer, and modification products thereof. Examples of the modification products include products obtainable by graft copolymerizing modifying agents to these copolymers, and products obtainable by copolymerizing modifying agents to the main chains of these copolymers. Examples of the modifying agents include unsaturated dicarboxylic acids such as maleic acid, citraconic acid, halogenated maleic acid, itaconic acid, cis-4-cyclohexene-1,2-dicarboxylic acid, and endo-cis-bicyclo[2.2.1]-5-heptene-2,3-dicarboxylic acid; esters, amides or imides of unsaturated dicarboxylic acids; unsaturated dicarboxylic acid anhydrides such as maleic anhydride, citraconic anhydride, halogenated maleic anhydride, itaconic anhydride, cis-4-cyclohexene-1,2-dicarboxylic acid anhydride, and endo-cis-bicyclo[2.2.1]-5-heptene-2,3-dicarboxylic acid anhydride; unsaturated monocarboxylic acids such as acrylic acid, methacrylic acid, and crotonic acid; and esters of unsaturated monocarboxylic acids (methyl acrylate, ethyl acrylate, methyl methacrylate, ethyl methacrylate, and the like), amides or imides of unsaturated monocarboxylic acids. The ethylene-α-olefin copolymer (3) is preferably an unmodified copolymer.

Among them, from the viewpoint of being easily available at relatively low cost, an ethylene-propylene copolymer, an ethylene-1-butene copolymer, and an ethylene-1-octene copolymer are preferred.

The melt flow rate of the ethylene-α-olefin copolymer (3) under the conditions of 230° C. and a load of 21.6 N is preferably 0.1 g/10 min to 30 g/10 min, more preferably 1 g/10 min to 20 g/10 min, and even more preferably 1 g/10 min to 10 g/10 min, from the viewpoint of the molding processability of the resin composition (X).

Furthermore, the melting point of the ethylene-α-olefin copolymer (3) is not particularly limited; however, the melting point is preferably 40° C. to 120° C., more preferably 40° C. to 105° C., and even more preferably 40° C. to 70° C.

The ethylene-α-olefin copolymers (3) may be used singly or in combination of two or more kinds thereof.

(Contents of Respective Components)

The resin composition (X) includes 100 parts by mass of the polypropylene-based resin (1) (hereinafter, referred to as component (1)), 5 parts by mass to 95 parts by mass of the thermoplastic elastomer (2) (hereinafter, referred to as component (2)), and 10 parts by mass to 95 parts by mass of the ethylene-α-olefin copolymer (3) (hereinafter, referred to as component (3)).

If the content of the component (2) is less than 5 parts by mass relative to 100 parts by mass of the component (1), flexibility and transparency are decreased. If the content is more than 95 parts by mass, molding processability is deteriorated, and therefore, the economic efficiency becomes poor. From the same point of view, the content of the component (2) in the resin composition (X) is preferably 10 parts by mass to 95 parts by mass, more preferably 10 parts by mass to 90 parts by mass, even more preferably 15 parts by mass to 85 parts by mass, and most preferably 20 parts by mass to 85 parts by mass, relative to 100 parts by mass of the component (1).

Furthermore, if the content of the component (3) is less than 10 parts by mass relative to 100 parts by mass of the component (1), the bag-breaking strength at normal temperature is not improved. It was found by an investigation made by the inventors of the present invention that the cause for this is as follows. The starting points of damage caused by impact, dropping or the like lie along the boundary lines between the heat-sealed sites and the sites that are not heat-sealed in the inner layer. Cracks develop from the boundary lines, and in a case in which the content of the component (3) is less than 10 parts by mass relative to 100 parts by mass of the component (1), since cracks are propagated toward the surface of the liquid packaging container as shown in the crack propagation mode B in FIG. 1, sufficient bag-breaking strength is not obtained. On the other hand, when the content of the component (3) is 10 parts by mass or more relative to 100 parts by mass of the component (1), cracks first develop toward the surface of the liquid packaging container as shown in the crack propagation mode A in FIG. 1; however, it was found that the cracks in the surface direction stop at the intermediate layer, and thereafter, the cracks are propagated along the interface between the inner layer and the intermediate layer. As a result, the liquid packaging container being damaged and becoming unusable can be avoided, and the bag-breaking strength is improved. The accurate reason why the propagation direction of cracks is controlled or guided as in the case of the crack propagation mode A is not clearly understood; however, the reason is speculated to be as follows. That is, since the component (1) and the component (2) in the resin composition (X) that constitutes the intermediate layer are highly compatible with each other, the resin composition (X) forms a homogeneous phase, and this serves as a continuous phase. In addition, it is speculated that since the component (3) that has insufficient compatibility with the component (1) is included in a predetermined amount or more, the component (3) is dispersed in the component (1) to form a dispersed phase, and since this dispersed phase is oriented, cracks follow the dispersed phase and grow along the interfaces. Usually, for the purpose of making a flexible and uniform intermediate layer, the content of the component (3) that has insufficient compatibility is reduced, or the component (3) is not incorporated; however, according to the present invention, a new effect has been exhibited by conversely increasing the content of the component (3).

On the other hand, if the content of the component (3) is more than 95 parts by mass relative to 100 parts by mass of the component (1), flexibility and transparency are deteriorated.

From the same point of view, the content of the component (3) in the resin composition (X) is preferably 10 parts by mass to 70 parts by mass, more preferably 10 parts by mass to 55 parts by mass, even more preferably 10 parts by mass to 40 parts by mass, and particularly preferably 10 parts by mass to 35 parts by mass, relative to 100 parts by mass of the component (1).

[Other Components]

The resin composition (X) may also include, in addition to the components (1) to (3) described above, additives such as an oxidation inhibitor, an ultraviolet absorber, a photo-stabilizer, a colorant, and a crystal nucleating agent; hydrogenated resins such as a hydrogenated coumarone-indene resin, a hydrogenated rosin-based resin, a hydrogenated terpene resin, and an alicyclic hydrogenated petroleum resin; tackifying resins such as aliphatic resins formed from olefin and diolefin polymers; and other polymers such as hydrogenated polyisoprene, hydrogenated polybutadiene, a hydrogenated styrene-butadiene random copolymer, a hydrogenated styrene-isoprene random copolymer, a butyl rubber, polyisobutylene, and polybutene, to the extent that the effects of the invention are not impaired.

Meanwhile, in the resin composition (X), the total content of the components (1) to (3) is preferably 50% by mass or more, more preferably 70% by mass or more, even more preferably 80% by mass or more, still more preferably 90% by mass or more, and even more preferably 95% by mass or more, from the viewpoint of the effects of the present invention.

(Inner Layer)

Next, the material for the inner layer, which is a layer that is brought into contact with the liquid, will be explained. The inner layer is formed from a resin composition (Y) as described below.

Resin composition (Y): a resin composition including 100 parts by mass of a polypropylene-based resin (1') which has a content of a structural unit derived from a propylene monomer of 60 mol % or more; and 5 parts by mass to 250 parts by mass of a thermoplastic elastomer (2') having a polymer block which contains a structural unit derived from an aromatic vinyl compound as a main component and a polymer block which contains a structural unit derived from a conjugated diene compound as a main component (provided that an ethylene-α-olefin copolymer having a content of a structural unit derived from an ethylene monomer of 50 mol % to 95 mol % is not included or, if included, the content of the copolymer is less than 10 parts by mass).

Here, the "ethylene-α-olefin copolymer having a content of a structural unit derived from an ethylene monomer of 50 mol % to 95 mol %" described in the proviso corresponds to the component (3) of the resin composition (X). The resin composition (Y) including the polypropylene-based resin (1') and the thermoplastic elastomer (2') does not include the ethylene-α-olefin copolymer, or even if the resin composition (Y) includes the copolymer, the content of the copolymer is less than 10 parts by mass. Therefore, the resin composition (Y) is not the same as the resin composition (X). If the resin composition (Y) includes the ethylene-α-olefin copolymer in an amount of 10 parts by mass or more relative to 100 parts by mass of the polypropylene-based resin (1'), the (inner layer)-(inner layer) adhesion is likely to occur, and therefore, it is not feasible to use the resin composition (Y) in a liquid packaging container. Therefore, even in a case in which the resin composition (Y) includes the ethylene-α-olefin copolymer, the content thereof is preferably 5 parts by mass or less, more preferably 3 parts by mass or less, and even more preferably 1 part by mass or less, relative to 100 parts by mass of the polypropylene-based resin (1').

Regarding the polypropylene-based resin (1'), the same explanation as the explanation for the polypropylene-based resin (1) in the resin composition (X) described above applies.

Above all, the content of the structural unit derived from a propylene monomer of the polypropylene-based resin (1') is preferably 80 mol % or more, more preferably 80 mol % to 100 mol %, even more preferably 80 mol % to 99 mol %, and particularly preferably 85 mol % to 95 mol %.

Furthermore, the melting point of the polypropylene-based resin (1') is preferably 120° C. to 140° C. When the melting point of the polypropylene-based resin (1') is 120° C. or higher, the (inner layer)-(inner layer) adhesion is easily suppressed. Furthermore, when the melting point of the polypropylene-based resin (1') is 140° C. or lower, satisfactory heat-sealability is obtained.

Furthermore, the polypropylene-based resin (1') is preferably at least one selected from a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, and a propylene-ethylene-hexene random copolymer.

The thermoplastic elastomer (2') is a thermoplastic elastomer having a polymer block which contains a structural unit derived from an aromatic vinyl compound as a main component, and a polymer block which contains a structural unit derived from a conjugated diene compound as a main component. Preferably, the thermoplastic elastomer (2') is a thermoplastic elastomer obtained by hydrogenating a block copolymer having a polymer block (A) which contains a structural unit derived from an aromatic vinyl compound as a main component and has a number average molecular weight of 2,500 to 100,000 and a polymer block (B) which contains a structural unit derived from a conjugated diene compound as a main component and has a content of a vinyl bond structural unit of 50 mol % or more and a number average molecular weight of 10,000 to 300,000, and it is preferable that 80 mol % or more of the carbon-carbon double bonds of the polymer block (B) are hydrogenated, while the number average molecular weight of the thermoplastic elastomer is 20,000 to 500,000.

In regard to the thermoplastic elastomer obtained by hydrogenating a block copolymer having the polymer block (A) and the polymer block (B), the same explanation as the explanation for the thermoplastic elastomer (2) described above applies, and preferable ranges thereof also apply. The production method is explained in the same manner.

(Contents of Respective Components)

The resin composition (Y) includes 100 parts by mass of the polypropylene-based resin (1') (hereinafter, referred to as component (1")), and 5 parts by mass to 250 parts by mass of the thermoplastic elastomer (2') (hereinafter, referred to as component (2')). If the content of the component (2') is less than 5 parts by mass, flexibility is decreased, and if the content is more than 250 parts by mass, the (inner layer)-(inner layer) adhesion is increased, and the molding processability is deteriorated, so that the economic efficiency becomes poor. From the same point of view, the resin composition (Y) preferably includes 100 parts by mass of the component (1') and 10 parts by mass to 150 parts by mass of the component (2'); more preferably includes 100 parts by mass of the component (1') and 20 parts by mass to 100 parts by mass of the component (2'); even more preferably includes 100 parts by mass of the component (1') and 20 parts by mass to 60 parts by mass of the component (2'); and particularly preferably includes 100 parts by mass of the component (1') and 35 parts by mass to 60 parts by mass of the component (2').

In regard to the resin composition (Y), when the contents of the respective components are in the ranges described above, satisfactory transparency, heat-sealability and heat resistance are obtained, and the (inner layer)-(inner layer) adhesion is also easily suppressed.

The resin composition (Y) may also include, in addition to the components (1') and (2') described above, additives such as an oxidation inhibitor, an ultraviolet absorber, a photostabilizer, a colorant, and a crystal nucleating agent; hydrogenated resins such as a hydrogenated chromane-indene resin, a hydrogenated rosin-based resin, a hydrogenated terpene resin, and an alicyclic hydrogenated petroleum resin; tackifying resins such as aliphatic resins formed from olefin and diolefin polymers; and other polymers such as hydrogenated polyisoprene, hydrogenated polybutadiene, a hydrogenated styrene-butadiene random copolymer, a hydrogenated styrene-isoprene random copolymer, a butyl rubber, polyisobutylene, and polybutene, to the extent that the effects of the invention are not impaired.

Meanwhile, the total content of the components (1') and (2') in the resin composition (Y) is preferably 50% by mass or more, more preferably 70% by mass or more, even more preferably 80% by mass or more, still more preferably 90% by mass or more, and even more preferably 95% by mass or more, from the viewpoint of the effects of the invention.

(Outer Layer)

Next, the material for the outer layer, which is a layer that is brought into contact with the open air when the layer is used in the liquid packaging container, will be explained. The outer layer is formed from a resin composition (Z) as described below.

Resin composition (Z): a resin composition including 100 parts by mass of a polypropylene-based resin (1") having a content of a structural unit derived from a propylene monomer of 60 mol % or more, and 0 parts by mass to 35 parts by mass of a thermoplastic elastomer (2") having a polymer block which contains a structural unit derived from an aromatic vinyl compound as a main component and a polymer block which contains a structural unit derived from a conjugated diene compound as a main component.

Regarding the polypropylene-based resin (1"), the same explanation as the explanation for the polypropylene-based resin (1) in the resin composition (X) described above applies.

Above all, the melting point of the polypropylene-based resin (1") is preferably 140° C. to 180° C., more preferably 150° C. to 170° C., and even more preferably 155° C. to 170° C.

Furthermore, the polypropylene-based resin (1") is preferably at least one selected from homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, and a propylene-ethylene-hexene random copolymer. Among them, from the viewpoint of being easily available at relatively low cost, homopolypropylene, a propylene-ethylene random copolymer, and a propylene-ethylene block copolymer are preferred; homopolypropylene and a propylene-ethylene random copolymer are more preferred; and homopolypropylene is even more preferred.

Furthermore, the thermoplastic elastomer (2") is a thermoplastic elastomer having a polymer block which contains a structural unit derived from an aromatic vinyl compound as a main component and a polymer block which contains a structural unit derived from a conjugated diene compound as a main component. Preferably, the thermoplastic elastomer (2") is a thermoplastic elastomer obtainable by hydrogenating a block copolymer having a polymer block (A) which contains a structural unit derived from an aromatic vinyl compound as a main component and has a number average molecular weight of 2,500 to 100,000, and a polymer block (B) which contains a structural unit derived from a conjugated diene compound as a main component and has a content of a vinyl bond structural unit of 50 mol % or more and a number average molecular weight of 10,000 to 300,000, and it is preferable that 80 mol % or more of the carbon-carbon double bonds of the polymer block (B) are hydrogenated, while the number average molecular weight of the thermoplastic elastomer is 20,000 to 500,000.

In regard to the thermoplastic elastomer obtained by hydrogenating a block copolymer having the polymer block (A) and the polymer block (B), the same explanation as the explanation for the thermoplastic elastomer (2) described above applies, and preferred ranges thereof also apply. The production method is also explained in the same manner.

(Contents of Respective Components)

The resin composition (Z) includes 100 parts by mass of the polypropylene-based resin (1") (hereinafter, referred to as component (1")), and 0 parts by mass to 35 parts by mass of the thermoplastic elastomer (2") (hereinafter, referred to as component (2")). If the content of the component (2") is more than 35 parts by mass relative to 100 parts by mass of the component (1"), the molding processability is deteriorated, and therefore, the economic efficiency becomes poor. Furthermore, when the content of the component (2") is 35 parts by mass or less relative to 100 parts by mass of the component (1"), the content proportion of the component (1") is sufficient, and when a liquid packaging container is produced, the layer can be easily cut off into the bag size. Also, a liquid packaging container is obtained which has high heat resistance and mechanical strength, and also has excellent handleability because the material is less tacky.

From the viewpoint described above, the content of the component (2") is preferably 0 parts by mass to 30 parts by mass, more preferably 0 parts by mass to 15 parts by mass, and even more preferably 0 parts by mass to 8 parts by mass, relative to 100 parts by mass of the component (1").

The resin composition (Z) may also include, in addition to the components (1") and (2"), additives such as an oxidation inhibitor, an ultraviolet absorber, a photostabilizer, a colorant, and a crystal nucleating agent; hydrogenated resins such as a hydrogenated chromane-indene resin, a hydrogenated rosin-based resin, a hydrogenated terpene resin, and an alicyclic hydrogenated petroleum resin; tackifying resins such as aliphatic resins formed from olefin and diolefin polymers; and other polymers such as hydrogenated polyisoprene, hydrogenated polybutadiene, a hydrogenated styrene-butadiene random copolymer, a hydrogenated styrene-isoprene random copolymer, a butyl rubber, polyisobutylene, and polybutene, to the extent that the effects of the invention are not impaired. Furthermore, in a case in which the resin composition (Z) includes an ethylene-α-olefin copolymer having a content of a structural unit derived from an ethylene monomer of 50 mol % to 95 mol %, it is preferable that the content of the copolymer is less than 10 parts by mass relative to 100 parts by mass of the component (1").

Meanwhile, the total content of the components (1") and (2") in the resin composition (Z) is preferably 50% by mass or more, more preferably 70% by mass or more, even more preferably 80% by mass or more, still more preferably 90% by mass or more, and even more preferably 95% by mass or more, from the viewpoint of the effects of the invention.

(Thicknesses of Inner Layer, Intermediate Layer, and Outer Layer)

The thicknesses of the inner layer, the intermediate layer, and the outer layer are not particularly limited, and the thicknesses can be appropriately adjusted according to the applications. The thickness of the inner layer is preferably 5 μm to 30 μm, and more preferably 10 μm to 30 μm. The thickness of the intermediate layer is preferably 100 μm to 300 μm, more preferably 100 μm to 200 μm, and even more preferably 100 mm to 180 μm. The thickness of the outer layer is preferably 15 μm to 120 μm, more preferably 15 μm to 80 μm, and even more preferably 15 μm to 70 μm.

There may be another layer between the layers of the inner layer, the intermediate layer and the outer layer, or on the surface of the outer layer, as long as the effects of the invention are not impaired. Examples of the other layer include an adhesive layer, a protective layer, a coating layer, a light-reflecting layer, and a light-absorbing layer.

In regard to the liquid packaging container of the invention, it is preferable that the inner layer and the intermediate layer are in contact, and it is preferable that the intermediate layer and the outer layer are in contact.

[Method for Producing Liquid Packaging Container]

The method for producing the liquid packaging container formed from a laminate of at least three layers including an inner layer, an intermediate layer and an outer layer is not particularly limited. A laminate is formed by utilizing a known method for producing a laminate, subsequently the laminate is heat-sealed and then cut off (cut out), thereby producing a liquid packaging container. In the case of being used for a medical application, the liquid packaging container is further sterilized. Here, when the resin compositions of the respective layers are used, satisfactory film-forming properties are obtained. Therefore, there is an advantage that a film (laminate) free from fish-eyes, foreign matters, and the like can be easily formed.

Regarding the method for producing a laminate, for example, the following method may be preferably mentioned. First, the materials of the respective layers are kneaded using a kneading machine such as a single-screw extruder, a twin-screw extruder, a kneader, a BANBURY mixer, or a roll, and the resin compositions of the respective layers are prepared. The respective resin compositions thus obtained are molded into a film form, a sheet form, a tube form, or the like, through co-extrusion molding using a multilayer T-die, or through air-cooled or water-cooled inflation molding using a multilayer circular T-die. The resin temperature at the time of molding is preferably 150° C. to 300° C., more preferably 180° C. to 250° C., and even more preferably 180° C. to 220° C. The cooling temperature at the time of air-cooled or water-cooled inflation molding is preferably 7° C. to 70° C., and more preferably 10° C. to 40° C. Furthermore, from the viewpoint of the ease of production of the liquid packaging container, it is preferable to mold the laminate into a tube form. When a tube-shaped molded product is used, a liquid packaging container can be produced by heat-sealing, followed by cutting off (cutting out), of the molded product. On the other hand, in the case of a film-like or sheet-like molded product, it is required that two sheets of the laminate are superposed and then heat-sealed.

In the case of medical applications, the liquid packaging container is further subjected to steam sterilization or autoclave sterilization as a sterilization treatment. In the case of autoclave sterilization, the heating temperature is preferably 100° C. to 150° C., and more preferably 110° C. to 140° C.

Meanwhile, a container having a port for injecting a liquid, a cap including a rubber stopper for taking out a liquid, and the like is effectively utilized as a medical container such as an infusion solution bag. As such, the invention also provides a medical container having the liquid packaging container.

[Applications]

The liquid packaging container of the invention can be used for various applications. For example, the liquid packaging container can be effectively used as a medical container as described above, as well as a food packaging container for packaging a retort food, mayonnaise, ketchup, a refreshing beverage, ice, or the like.

EXAMPLES

Hereinafter, the present invention will be specifically explained by way of Examples and the like, but the present invention is not intended to be limited to these Examples. Meanwhile, each of the physical properties in the Examples and the Comparative Examples were measured or evaluated by the following methods.

[Methods for Measurement or Evaluation]

<1. Number Average Molecular Weight (Mn) and Molecular Weight Distribution (Mw/Mn)>

These were determined by gel permeation chromatography (GPC) as molecular weights calculated relative to polystyrene standards.

Apparatus: GPC apparatus "HLC-8020" (manufactured by Tosoh Corp.)

Separating column: "TSKgel GMHXL", "G4000HXL" and "G5000HXL" manufactured by Tosoh Corp. were connected in series.

Eluent: Tetrahydrofuran

Flow rate of eluent 1.0 ml/min

Column temperature: 40° C.

Detection method: Differential refractive index (RI)

(1-1. Method for Measuring Mn of Polymer Block (A) and Mn of Polymer Block (B))

In each of Production Examples, the Mn of each polymer block was measured according to the method described above by performing sampling in the stage in which each polymer block was formed. Specifically, the polymer block (A) was formed by polymerization of styrene, and the Mn was first measured. Subsequently, the polymer block (B) was formed by further polymerizing butadiene and/or isoprene, and the Mn of the polymer blocks (A)-(B) was measured. At this time, since the latter Mn is the Mn of the polymer blocks (A) and (B) as a whole, the Mn of the polymer block (B) was calculated by subtracting the previously measured Mn of the polymer block (A) therefrom. Also, in a case in which polymer blocks (A)-(B)-(A) were formed, the Mn of the polymer block (A) that was formed lastly was calculated by the same technique, and even in a case in which polymer blocks (A)-(B)-(A)-(B) were formed, the Mn of the polymer block (B) that was formed lastly was calculated by the same technique.

<2. A Content of Polymer Block (A) and a Content of Vinyl Bonds (a Content of 1,2-Bonds and a Content of 3,4-Bonds) of Polymer Block (B) in Thermoplastic Elastomer>

These were determined by a $^1$H-NMR analysis.

Apparatus: Nuclear magnetic resonance apparatus "LAMBDA-500" (manufactured by JEOL, Ltd.)

Solvent: Deuterated chloroform

<3. Melting Point>

A sample that had been melted by heating from 30° C. to 250° C. at a rate of temperature increase of 10° C./min, was cooled from 250° C. to 30° C. at a rate of temperature decrease of 10° C./min, and then was heated from 30° C. to 250° C. at a rate of temperature increase of 10° C./min, using a differential scanning calorimeter (DSC) "TGA/DSC1 STAR SYSTEM" (manufactured by Mettler Toledo, Inc.), and the peak top temperature of an endotherm peak measured from the cycle was designated as the melting point.

Measurements and evaluations were carried out by the following methods, using the laminates each having a thickness of 200 μm, which had been produced in Examples and Comparative Examples.

<I. Young's Modulus>

A specimen having a size of 25 mm×75 mm was produced, and Young's modulus was measured using "INSTRON 3345" (manufactured by Instron Corporation) under the conditions of 5 mm/min. A smaller value means superior flexibility. A value of 300 MPa or less is the target value.

<II. Haze and Haze After Sterilization Treatment>

The haze was measured using a haze meter "HR-100" (Manufactured by Murakami Color Research Laboratory Co., Ltd.).

Furthermore, a laminate was subjected to a sterilization treatment for 30 minutes at 121° C. in an autoclave, and then the haze was measured in the same manner as described above.

A smaller value means superior transparency. The target value is 20% or less for the haze before the sterilization treatment, and 30% or less for the haze after the sterilization treatment.

<III. Heat-Seal Strength>

A specimen was produced by performing heat sealing under the conditions of 140° C., 0.4 MPa, and 1 second, while having the inner layers of laminates brought into contact. Using this specimen, a 180° peeling test was carried out using "INSTRON 3345" (manufactured by Instron Corporation) under the conditions of 300 mm/min. A larger value means higher heat-seal strength. A heat-seal strength of 70 N/25 mm or more is preferable.

<IV. Bag-Breaking Strength (Normal Temperature)>

A laminate was cut out into a size of 15 cm×9 cm, and two sheets thereof were used to superpose the inner layers. Three sides among the four sides were heat-sealed under the conditions of 140° C., 0.4 MPa, and a heating time of 1 second. Subsequently, 100 cc of water was injected through the opened one side, and then the one side was heat-sealed under the conditions described above. Thus, a liquid packaging container having an internal capacity of 100 cc was produced.

The liquid packaging container thus obtained was mounted on an iron plate in an environment at 23° C., and then the iron plate having a weight of 1 kg (9.8 N) was dropped three times from above. The same measurement was performed at an interval of 3 cm, and the upper limit height for non-bag breaking was designated as an index for the bag-breaking strength at normal temperature. A larger value means higher bag-breaking strength at normal temperature. The bag-breaking strength is preferably 40 cm or more, more preferably 45 cm or more, and particularly preferably 48 cm or more.

Furthermore, after the test for bag-breaking strength, the liquid packaging container was observed by scanning electron microscopy (SEM), and an observation was made for cracks that were propagated from the boundary lines between the heat-sealed sites and the sites that were not heat-sealed in the inner layer. The cracking was evaluated according to the following evaluation criteria.

A: Cracks are propagated in parallel to the plane direction of the laminate along the interface between the inner layer and the intermediate layer (crack propagation mode A).

B: Cracks are propagated toward the laminate surface (crack propagation mode B).

<V. Low-Temperature Bag-Breaking Strength>

The liquid packaging container produced for the evaluation of bag-breaking strength was mounted on an iron plate in an environment at 4° C., and then the iron plate having a weight of 1 kg (9.8 N) was dropped three times from above. The same measurement was performed at an interval of 3 cm, and the upper limit height for non-bag breaking was designated as an index for the low-temperature bag-breaking strength. A larger value means higher low-temperature bag-breaking strength. The low-temperature bag-breaking strength is preferably 20 cm or more, more preferably 23 cm or more, even more preferably 25 cm or more, and particularly preferably 28 cm or more.

<VI. (Inner Layer)-(Inner Layer) Adhesion>

The inner layers of laminates were brought into contact at a pressure of 0.2 kg/cm$^2$, and in this state, the laminates were mounted on a hot plate at 120° C. for 5 seconds. The inner layers of the laminates were detached by hand, and the detachment was evaluated according to the following evaluation criteria.

1: The inner layers could be easily detached without any resistance to detachment.

2: Resistance to detachment was exhibited, accompanied by deformation and whitening of the laminate.

3: Strong resistance to detachment was exhibited, and detachment was difficult.

<VII. Film-Forming Properties>

Surging (the amount of extrusion is not constant during molding processing, and the shape or dimension of a product becomes irregular or varies regularly) of the laminate (film), and the presence or absence of foreign matters and fish-eyes caused by kneading failure were checked, and an evaluation was conducted according to the following evaluation criteria. This was designated as an index for film-forming properties.

A: A film cut into a length of 2 m in the MD direction has a thickness accuracy of less than ±10% in both the MD direction and the TD direction, and foreign matters and fish-eyes are not recognized by visual inspection.

B: A film cut into a length of 2 m in the MD direction has a thickness accuracy of ±10% or more in at least one of the MD direction and the TD direction, or foreign matters or fish-eyes are recognizable by visual inspection.

[Raw Material Polymers Used in Examples]

The details of each of the components used in the Examples and the Comparative Examples, or production methods therefor will be described below. Furthermore, the physical properties of each of the components are summarized in Tables 1 to 3.

[Polypropylene-Based Resin]

PP1: "PT-100" (manufactured by LCY Chemical Corporation), homopolypropylene, MFR: 1.6 g/10 min (230° C., 21.6 N), melting point: 164° C., propylene content: 100 mol %

PP2: "SB-520Y" (manufactured by Lotte Chemical Corporation), propylene-ethylene random copolymer, MFR: 2.4 g/10 min (230° C., 21.6 N), melting point: 154° C., propylene content: 97 mol %

PP3: "SFC-750D" (manufactured by Lotte Chemical Corporation), propylene-butene random copolymer, MFR: 5.8 g/10 min (230° C., 21.6 N), melting point: 130° C., propylene content: 90 mol %

TABLE 1

| | Polypropylene-based resin | | |
|---|---|---|---|
| | PP1 | PP2 | PP3 |
| Kind | Homopolypropylene | Propylene-ethylene random copolymer | Propylene-butene random copolymer |
| Melting point (° C.) | 164 | 154 | 130 |
| MFR (230° C., 21.6 N) | 1.6 | 2.4 | 5.8 |
| Propylene content (mol %) | 100 | 97 | 90 |

[Thermoplastic Elastomer (Hydrogenation Product)]

TPS1: Hydrogenation product of styrene-(isoprene/butadiene)-styrene block copolymer, content of vinyl bonds: 60%

TPS2: Hydrogenation product of styrene-isoprene-styrene block copolymer, content of vinyl bonds: 55%

TPS3: Hydrogenation product of styrene-butadiene-styrene block copolymer, content of vinyl bonds: 75%

TPS4: Hydrogenation product of styrene-(isoprene/butadiene)-styrene block copolymer, content of vinyl bonds: 60%

TPS5: Hydrogenation product of styrene-(isoprene/butadiene)-styrene block copolymer, content of vinyl bonds: 60%

TPS6: Hydrogenation product of styrene-(isoprene/butadiene)-styrene block copolymer, content of vinyl bonds: 60%

TPS7: Hydrogenation product of styrene-(isoprene/butadiene)-styrene block copolymer, content of vinyl bonds: 80%

TPS8: Hydrogenation product of styrene-(isoprene/butadiene)-styrene block copolymer, content of vinyl bonds: 60%

TPS9: Hydrogenation product of styrene-(isoprene/butadiene)-styrene block copolymer, content of vinyl bonds: 70%

TPS10: Hydrogenation product of styrene-butadiene-styrene-butadiene block copolymer, content of vinyl bonds: 75%

TPS11: Hydrogenation product of styrene-(isoprene/butadiene)-styrene block copolymer, content of vinyl bonds: 60%

TPS12: Hydrogenation product of styrene-isoprene-styrene block copolymer, content of vinyl bonds: 7%

TPS13: Hydrogenation product of styrene-butadiene-styrene block copolymer, content of vinyl bonds: 40%

The method for producing TPS1 to TPS13 is as follows.

Production Example 1

Into a pressure-resistant container that had been purged with nitrogen and dried, 50.0 kg of cyclohexane as a solvent, and 76 g of sec-butyllithium (10.5 mass % cyclohexane solution) (8.0 g of sec-butyllithium) as an anionic polymerization initiator were introduced, and 313 g of tetrahydrofuran as a Lewis base was introduced. After the mixture was heated to 50° C., 0.5 kg of styrene (1) was added thereto, and the mixture was polymerized for 1 hour. Subsequently, a mixed liquid of 8.2 kg of isoprene and 6.5 kg of butadiene was added thereto, and polymerization was performed for 2 hours. Furthermore, 1.5 kg of styrene (2) was added thereto, and polymerization was performed for 1 hour. Thereby, a reaction liquid containing a polystyrene-poly(isoprene/butadiene)-polystyrene triblock copolymer was obtained. To this reaction liquid, palladium carbon (amount of palladium supported: 5% by mass) was added as a hydrogenation catalyst in an amount of 5% by mass with respect to the block copolymer, and a reaction was carried out for 10 hours under the conditions of a hydrogen pressure of 2 MPa and 150° C. After allowing the reaction liquid to cool naturally and release pressure, palladium carbon was removed by filtration, and the filtrate was concentrated and was further dried in a vacuum. Thereby, a hydrogenation product of the polystyrene-poly(isoprene/butadiene)-polystyrene triblock copolymer (hereinafter, referred to as hydrogenated block copolymer TPS1) was obtained. The hydrogenated block copolymer (TPS1) was subjected to the evaluations described above. Meanwhile, the measurement of the Mn value of each polymer block was carried out by the method described above. The results are presented in Table 2.

Production Examples 2, 4 to 9, and Production Example 13

Hydrogenated block copolymers (TPS2), (TPS4) to (TPS9), and (TPS13) were produced in the same manner as in Production Example 1, except that the compositions were changed to the blends described in Table 2. The hydrogenated block copolymers (TPS2), (TPS4) to (TPS9), and (TPS13) thus obtained were subjected to the evaluations described above. Meanwhile, the measurement of the Mn value of each polymer block was carried out by the method described above. The results are presented in Table 2.

Production Example 3

A hydrogenated block copolymer (TPS3) was produced in the same manner as in Production Example 1, except that N,N,N',N'-tetramethylethylenediamine was used as a Lewis base, and the composition was changed to the blend described in Table 2. The hydrogenated block copolymer (TPS3) thus obtained was subjected to the evaluations described above. Meanwhile, the measurement of the Mn value of each polymer block was carried out by the method described above. The results are presented in Table 2.

Production Example 10

A hydrogenated block copolymer (TPS10) was produced in the same manner as in Production Example 1, except that N,N,N',N'-tetramethylethylenediamine was used as a Lewis base, and according to the blend described in Table 2, styrene (1) was added and then polymerization was performed for 1 hour; subsequently butadiene (1) was added and then polymerization was performed for 2 hours; styrene (2) was further added and then polymerization was performed for 1 hour; and butadiene (2) was further added and then polymerization was performed for 1 hour. The hydrogenated block copolymer (TPS10) thus obtained was subjected to the evaluations described above. Meanwhile, the measurement of the Mn value of each polymer block was carried out by the method described above. The results are presented in Table 2.

Production Example 11

A hydrogenated block copolymer (TPS11) was produced in the same manner as in Production Example 1, except that polymerization of styrene was performed, followed by polymerization of butadiene, according to the blend described in Table 2, subsequently 100 g of methyl benzoate as a coupling agent was added thereto, and then a reaction was carried out for 1 hour at 60° C. The hydrogenated block copolymer thus obtained (TPS11) was subjected to the evaluations described above. Meanwhile, the measurement of the Mn value of each polymer block was carried out by the method described above. The results are presented in Table 2.

Production Example 12

A hydrogenated block copolymer (TPS12) was produced in the same manner as in Production Example 1, except that tetrahydrofuran as a Lewis base was not added, and the composition was changed to the blend described in Table 2. The hydrogenated block copolymer (TPS12) thus obtained was subjected to the evaluations described above. The results are presented in Table 2.

TABLE 2

| | | Production Example 1 TPS-1 | Production Example 2 TPS-2 | Production Example 3 TPS-3 | Production Example 4 TPS-4 | Production Example 5 TPS-5 | Production Example 6 TPS-6 | Production Example 7 TPS-7 |
|---|---|---|---|---|---|---|---|---|
| Amount used [kg] | Cyclohexane | 50 | 50 | 50 | 50 | 50 | 50 | 50 |
| | sec-Butyllithium | 0.076 | 0.13 | 0.09 | 0.090 | 0.020 | 0.076 | 0.076 |
| | Styrene (1) | 0.5 | 1.8 | 1.0 | 0.67 | 0.27 | 0.50 | 0.50 |
| | Styrene (2) | 1.5 | 1.8 | 1.0 | 0.67 | 0.80 | 1.50 | 1.50 |
| | Butadiene (1) | 6.5 | — | 14.7 | 6.8 | 3.4 | 6.5 | 6.5 |
| | Butadiene (2) | — | — | — | — | — | — | — |
| | Isoprene | 8.2 | 13.2 | — | 8.50 | 4.30 | 8.20 | 8.2 |
| | Tetrahydrofuran | 0.31 | 0.29 | — | 0.31 | 0.29 | 0.31 | — |
| | N,N,N',N'-tetramethylethylenediamine | — | — | 0.03 | — | — | — | 0.03 |
| | Methyl benzoate | — | — | — | — | — | — | — |
| Content of polymer block (A) (mass %) | | 12 | 21 | 12 | 8 | 12 | 12 | 12 |
| Content of triblock body (mass %) | | 100 | 100 | 100 | 100 | 100 | 100 | 100 |
| Physical properties | Number average molecular weight of thermoplastic elastomer | 147,000 | 109,000 | 173,000 | 147,000 | 294,000 | 147,000 | 147,000 |
| | Number average molecular weight of polymer block (A) | 4,000 12,000 | 8,100 8,100 | 5,500 5,500 | 4,500 4,500 | 8,000 24,000 | 4,000 12,000 | 4,000 12,000 |
| | Number average molecular weight of polymer block (B) | 147,000 | 92,800 | 186,000 | 154,000 | 295,000 | 147,000 | 148,000 |
| | Molecular weight distribution (Mw/Mn) | 1.02 | 1.03 | 1.04 | 1.02 | 1.21 | 1.04 | 1.04 |
| | Hydrogenation ratio (mol %) | 89.3 | 90.5 | 92.3 | 92 | 90 | 97 | 90 |
| | Content of vinyl bonds of polymer block (B) (mol %) | 60 | 55 | 75 | 60 | 60 | 60 | 80 |

| | | Production Example 8 TPS-8 | Production Example 9 TPS-9 | Production Example 10 TPS-10 | Production Example 11 TPS-11 | Production Example 12 TPS-12 | Production Example 13 TPS-13 |
|---|---|---|---|---|---|---|---|
| Amount used [kg] | Cyclohexane | 50 | 50 | 50 | 50 | 50 | 50 |
| | sec-Butyllithium | 0.076 | 0.076 | 0.110 | 0.152 | 0.166 | 0.218 |
| | Styrene (1) | 0.50 | 0.50 | 1.08 | 2.00 | 1.5 | 2.5 |

TABLE 2-continued

|  |  | | | | | | |
|---|---|---|---|---|---|---|---|
| | Styrene (2) | 1.50 | 1.50 | 1.08 | — | 1.5 | 2.5 |
| | Butadiene (1) | 2.4 | 11.1 | 13.6 | 6.5 | — | 11.7 |
| | Butadiene (2) | — | — | 0.8 | — | — | — |
| | Isoprene | 12.2 | 3.5 | — | 8.2 | 13.7 | — |
| | Tetrahydrofuran | 0.19 | — | — | 0.31 | — | 0.11 |
| | N,N,N',N'-tetramethylethylenediamine | — | 0.03 | 0.03 | — | — | — |
| | Methyl benzoate | — | — | — | 0.10 | — | — |
| | Content of polymer block (A) (mass %) | 12 | 12 | 12 | 12 | 18 | 30 |
| | Content of triblock body (mass %) | 100 | 100 | 0 | 95 | 100 | 100 |
| Physical properties | Number average molecular weight of thermoplastic elastomer | 147,000 | 147,000 | 147,000 | 144,000 | 88,000 | 77,000 |
| | Number average molecular weight of polymer block (A) | 4,000 12,000 | 4,000 12,000 | 6,000 6,000 | 8,000 8,000 | 5,500 5,500 | 7,000 7,000 |
| | Number average molecular weight of polymer block (B) | 147,000 | 147,000 | 142,000 9,000 | 144,000 | 74,000 | 63,000 |
| | Molecular weight distribution (Mw/Mn) | 1.04 | 1.04 | 1.05 | 1.06 | 1.04 | 1.03 |
| | Hydrogenation ratio (mol %) | 90 | 95 | 97 | 97 | 98.3 | 98.9 |
| | Content of vinyl bonds of polymer block (B) (mol %) | 60 | 70 | 75 | 60 | 7 | 40 |

[Ethylene-α-Olefin Copolymer and Poly-α-Olefin]

POE 1: "TAFMER P-0775" (manufactured by Mitsui Chemicals, Inc.), ethylene-propylene random copolymer, MFR: 0.6 g/10 min (230° C., 21.6 N), melting point: 43° C., ethylene content: 56 mol %

POE2: Ethylene-butene random copolymer, "TAFMER A-4050S" (manufactured by Mitsui Chemicals, Inc.), MFR: 6.7 g/10 min (230° C., 21.6 N), melting point: 47° C., ethylene content: 80 mol %

POE3: "ENGAGE 8200" (manufactured by Dow Chemical Company), ethylene-octene random copolymer, MFR: 5 g/10 min (190° C., 21.6 N), melting point: 65° C., ethylene content: 93 mol %

POE4: "TAFMER P-0275" (manufactured by Mitsui Chemicals, Inc.), ethylene-propylene random copolymer, MFR: 5.4 g/10 min (230° C., 21.6 N), melting point: 49° C., ethylene content: 71 mol %

POE5: "VISTAMAXX 6102" (manufactured by Exxon Mobil Corporation), propylene-ethylene random copolymer, MFR: 3 g/10 min (230° C., 21.6 N), melting point: 108° C., ethylene content: 12 mol %

POE6: "TAFMER BL-2000" (manufactured by Mitsui Chemicals, Inc.), homopolybutene, MFR: 0.2 g/10 min (190° C., 21.6 N), melting point: 123° C., ethylene content: 0 mol %

TABLE 3

| | Ethylene-α-olefin copolymer, poly-α-olefin | | |
|---|---|---|---|
| | POE1 | POE2 | POE3 |
| Kind | Ethylene-propylene random copolymer | Ethylene-butene random copolymer | Ethylene-octene random copolymer |
| Ethylene content (mol %) | 56 | 80 | 93 |
| MFR (230° C., 21.6 N) (g/10 min) | 0.6 | 6.7 | — |
| MFR (190° C., 21.6 N) (g/10 min) | — | — | 5 |
| Melting point (° C.) | 43 | 47 | 65 |

| | Ethylene-α-olefin copolymer, poly-α-olefin | | |
|---|---|---|---|
| | POE4 | POE5 | POE6 |
| Kind | Ethylene-propylene random copolymer | Propylene-ethylene random copolymer | Homopolybutene |
| Ethylene content (mol %) | 71 | 12 | 0 |
| MFR (230° C., 21.6 N) (g/10 min) | 5.4 | 3 | — |
| MFR (190° C., 21.6 N) (g/10 min) | — | — | 0.2 |
| Melting point (° C.) | 49 | 108 | 123 |

Examples 1 to 20 and Comparative Examples 1 to 11

Production of Laminate

Laminates (films) having a thickness of 200 μm were molded using the materials described in Tables 1 to 3, at the blending proportions indicated in the following Table 4 or Table 5 for the material for the inner layer, the material for the intermediate layer, and the material for the outer layer, respectively, and using a water-cooled type downward inflation molding machine under the conditions of a resin temperature of 200° C., a cooling water temperature of 20° C., and a line speed of 10 m/min. The thicknesses of the respective layers were adjusted such that in Examples 1 to 14 and 16 to 20, and in Comparative Examples 1 to 11, the thicknesses were 20 μm for the inner layer, 130 μm for the intermediate layer, and 50 μm for the outer layer, and in Example 15, the thicknesses were 20 μm for the inner layer, 160 μm for the intermediate layer, and 20 μm for the outer layer. The physical properties of the respective laminates thus obtained are presented in Table 4 and Table 5.

Figure 2:
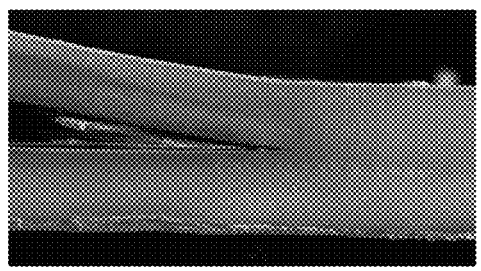
FIG. 2 is a scanning electron microscopic photograph obtained when the crack propagation mode in Example 1 was observed.
Figure 3:
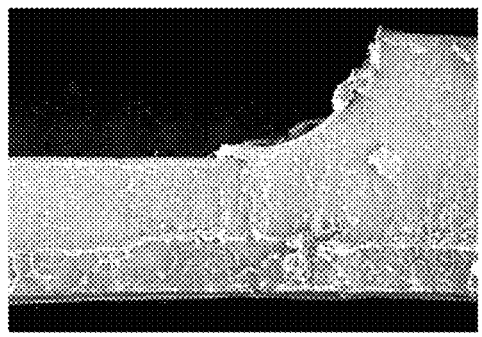
FIG. 3 is a scanning electron microscopic photograph obtained when the crack propagation mode in Comparative Example 1 was observed.

Furthermore, in regard to Example 1 and Comparative Example 1, scanning electron microscopic (SEM) photographs obtained when the crack propagation mode was observed are presented in FIG. 2 and FIG. 3, respectively.

TABLE 4

| | | | | Example | | | | | | | | | | | | | | | | | | |
|---|---|---|---|---|---|---|---|---|---|---|---|---|---|---|---|---|---|---|---|---|---|---|
| | | | | 1 | 2 | 3 | 4 | 5 | 6 | 7 | 8 | 9 | 10 | 11 | 12 | 13 | 14 | 15 | 16 | 17 | 18 | 19 | 20 |
| Outer layer | | PP1 | parts by mass | 100 | 100 | 100 | 100 | 100 | 100 | 100 | 100 | 100 | 100 | 100 | 100 | 100 | 100 | 100 | 100 | 100 | 100 | 100 | 100 |
| | | TPS1 | | 5 | 5 | 5 | 5 | 5 | 5 | 5 | 5 | 5 | 5 | 5 | 5 | 5 | 5 | 5 | 5 | 5 | 25 | 0 | 5 |
| | | Thickness | | 50 μm | | | | | | | | | | | | | | 20 μm | | | 50 μm | | |
| Intermediate layer | (2) | PP2 | parts by mass | 100 | 100 | 100 | 100 | 100 | 100 | 100 | 100 | 100 | 100 | 100 | 100 | 100 | 100 | 100 | 100 | 100 | 100 | 100 | 100 |
| | | TPS1 | | 38 | 38 | 23 | 17 | | | | | | | | | | | 38 | 38 | 38 | 38 | 38 | 80 |
| | | TPS2 | | | | | | 38 | | | | | | | | | | | | | | | |
| | | TPS3 | | | | | | | 38 | | | | | | | | | | | | | | |
| | | TPS4 | | | | | | | | 38 | | | | | | | | | | | | | |
| | | TPS5 | | | | | | | | | 38 | | | | | | | | | | | | |
| | | TPS6 | | | | | | | | | | 38 | | | | | | | | | | | |
| | | TPS7 | | | | | | | | | | | 38 | | | | | | | | | | |
| | | TPS8 | | | | | | | | | | | | 38 | | | | | | | | | |
| | | TPS9 | | | | | | | | | | | | | 38 | | | | | | | | |
| | | TPS10 | | | | | | | | | | | | | | 38 | | | | | | | |
| | | TPS11 | | | | | | | | | | | | | | | 38 | | | | | | |
| | | TPS12 | | | | | | | | | | | | | | | | | | | | | |
| | | TPS13 | | | | | | | | | | | | | | | | | | | | | |
| | (3) | POE1 | | 15 | | 31 | 50 | 15 | 15 | 15 | 15 | 15 | 15 | 15 | 15 | 15 | 15 | 15 | | 15 | 15 | 15 | 20 |
| | | POE2 | | | 15 | | | | | | | | | | | | | | | | | | |
| | | POE3 | | | | | | | | | | | | | | | | | 15 | | | | |

TABLE 4-continued

| | | | Example | | | | | | | | | | | | | | | | | | |
|---|---|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 17 | 18 | 19 | 20 |
| Inner layer | | POE4 | | | | | | | | | | | | | | | | | | | | |
| | | POE5 | | | | | | | | | | | | | | | | | 15 | | | |
| | | POE6 | | | | | | | | | | | | | | | | | | | | |
| | | Thickness | | | | | | | 130 µm | | | | | | | | 160 µm | | | 130 µm | | |
| | (1') | PP3 parts by mass | 100 | 100 | 100 | 100 | 100 | 100 | 100 | 100 | 100 | 100 | 100 | 100 | 100 | 100 | 100 | 100 | 100 | 100 | 100 | 100 |
| | (2') | TPS1 | 43 | 43 | 43 | 43 | | | | | | | | | | | | | | | | |
| | | TPS2 | | | | | 43 | | | | | | | | | | | | | | | | |
| | | TPS3 | | | | | | 43 | | | | | | | | | | | | | | | |
| | | TPS4 | | | | | | | 43 | | | | | | | | | | | | | | |
| | | TPS5 | | | | | | | | 43 | | | | | | | | | | | | | |
| | | TPS6 | | | | | | | | | 43 | | | | | | | | | | | | |
| | | TPS7 | | | | | | | | | | 43 | | | | | 43 | 43 | 43 | 43 | 43 | 43 |
| | | TPS8 | | | | | | | | | | | 43 | | | | | | | | | | |
| | | TPS9 | | | | | | | | | | | | 43 | | | | | | | | | |
| | | TPS10 | | | | | | | | | | | | | 43 | | | | | | | | |
| | | TPS11 | | | | | | | | | | | | | | 43 | | | | | | | |
| | | TPS12 | | | | | | | | | | | | | | | | | | | | | |
| | | TPS13 | | | | | | | | | | | | | | | | | | | | | |
| | | POE1 | | | | | | | | | | | | | | | | | | | | | |
| | | POE2 | | | | | | | | | | | | | | | | | | | | | |
| | | Thickness | | | | | | | | | | | | 20 µm | | | | | | | | | |
| | | | | | | | | | | Physical properties of laminate | | | | | | | | | | | | |
| I. Young's modulus | MPa | | 240 | 230 | 280 | 300 | 290 | 260 | 220 | 240 | 230 | 230 | 230 | 250 | 260 | 240 | 210 | 240 | 250 | 190 | 270 | 130 |
| II. Haze (before sterilization treatment) | % | | 11 | 10 | 16 | 20 | 11 | 11 | 10 | 13 | 10 | 10 | 10 | 11 | 11 | 11 | 12 | 15 | 10 | 11 | 10 | 5 |
| Haze (after sterilization treatment) | % | | 20 | 18 | 25 | 28 | 21 | 20 | 18 | 24 | 17 | 17 | 17 | 20 | 20 | 20 | 23 | 24 | 19 | 18 | 21 | 14 |
| III. Heat-seal strength | N/25 mm | | 90 | 93 | 95 | 90 | 75 | 85 | 92 | 92 | 92 | 92 | 90 | 88 | 87 | 88 | 90 | 85 | 80 | 95 | 80 | 88 |
| IV. Bag-breaking strength (normal temperature) | cm | | 48 | 51 | 60 | 67 | 48 | 45 | 50 | 52 | 51 | 51 | 49 | 47 | 47 | 47 | 60 | 54 | 51 | 57 | 51 | 90 |
| Crack propagation mode | — | | A | A | A | A | A | A | A | A | A | A | A | A | A | A | A | A | A | A | A | A |
| V. Low-temperature bag-breaking strength | cm | | 30 | 33 | 27 | 24 | 27 | 30 | 33 | 35 | 30 | 23 | 28 | 30 | 30 | 30 | 39 | 30 | 30 | 42 | 30 | 52 |
| VI. (Inner layer)-(inner layer) adhesion | — | | 1 | 1 | 1 | 1 | 1 | 1 | 1 | 1 | 1 | 1 | 1 | 1 | 1 | 1 | 1 | 1 | 1 | 1 | 1 | 1 |
| VII. Film-forming properties | — | | A | A | A | A | A | A | A | B | A | A | A | A | A | A | A | A | A | A | A | A |

TABLE 5

| | | | Comparative Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Outer layer | | PP1 parts by mass | 100 | 100 | 100 | 100 | 100 | 100 | 100 | 100 | 100 | 100 | 100 |
| | | TPS1 mass | 5 | 5 | 5 | 5 | 5 | 5 | 5 | 5 | 5 | 5 | 5 |
| | | Thickness | | | | | 50 μm | | | | | | |
| Intermediate layer | (1) | PP2 parts by | 100 | 100 | 100 | 100 | 100 | 100 | | 100 | 100 | 100 | 100 |
| | (2) | TPS1 mass | 54 | 46 | 54 | 38 | 38 | 38 | | 22 | 54 | | |
| | | TPS2 | | | | | | | | | | | |
| | | TPS3 | | | | | | | | | | | |
| | | TPS4 | | | | | | | | | | | 38 | |
| | | TPS5 | | | | | | | | | | | | 38 |
| | (3) | POE1 | | 8 | | 15 | | | 54 | 100 | | 15 | 15 |
| | | POE2 | | | | | | | | | | | |
| | | POE3 | | | | | | | | | | | |
| | | POE4 | | | | | | | | | | | |
| | | POE5 | | | | | 15 | | | | | | |
| | | POE6 | | | | | | 15 | | | | | |
| | | Thickness | | | | | 130 μm | | | | | | |
| Inner layer | (1') | PP3 parts by | 100 | 100 | 100 | 100 | 100 | 100 | 100 | 100 | 100 | 100 | 100 |
| | (2') | TPS1 mass | 43 | 43 | 29 | 29 | 43 | 43 | 43 | 43 | | | |
| | | TPS2 | | | | | | | | | | | |
| | | TPS3 | | | | | | | | | | | |
| | | TPS4 | | | | | | | | | | 43 | |
| | | TPS5 | | | | | | | | | | | 43 |
| | | POE1 | | | 14 | 14 | | | | | 43 | | |
| | | POE2 | | | | | | | | | | | |
| | | Thickness | | | | | 20 μm | | | | | | |
| Physical properties of laminate | | | | | | | | | | | | | |
| I. Young's modulus | MPa | | 240 | 240 | 210 | 240 | 230 | 240 | 400 | 330 | 320 | 400 | 470 |
| II. Haze (before sterilization treatment) | % | | 9 | 11 | 9 | 13 | 11 | 11 | 31 | 35 | 23 | 27 | 35 |
| Haze (after sterilization treatment) | % | | 10 | 13 | 12 | 23 | 14 | 13 | 45 | 45 | 34 | 40 | 44 |
| III. Heat-seal strength | N/25 mm | | 90 | 88 | 95 | 95 | 95 | 90 | 88 | 85 | 90 | 75 | 78 |
| IV. Bag-breaking strength (normal temperature) | cm | | 21 | 24 | 54 | 99 | 24 | 24 | 75 | 85 | 90 | 51 | 48 |
| Crack propagation mode | — | | B | B | A | A | B | B | A | A | A | A | A |
| V. Low-temperature bag-breaking strength | cm | | 30 | 27 | 30 | 30 | 30 | 33 | 12 | 12 | 15 | 12 | 12 |
| VI. (Inner layer)-(inner layer) adhesion | — | | 1 | 1 | 2 | 2 | 1 | 1 | 1 | 1 | 3 | 1 | 1 |
| VII. Film-forming properties | — | | A | A | A | A | A | A | A | A | A | A | A |

In Comparative Examples 1 and 2 in which the component (3) is not used in the intermediate layer, or the content of the component (3) is small, cracks were propagated by the crack propagation mode B, and the bag-breaking strength at normal temperature (23° C.) was low. In Comparative examples 3, 4 and 9 in which the component (3) was used in the inner layer (this implies that in Comparative Examples 3 and 4, the resin composition (X) was used for the inner layer), a problem of (inner layer)-(inner layer) adhesion occurred, and particularly in Comparative Example 9, flexibility and transparency were also deteriorated. In Comparative Examples 5 and 6 in which materials that were not equivalent to the component (3) as defined by the present invention (having a small ethylene content) were used in the intermediate layer, cracks were propagated by the crack propagation mode B, and the bag-breaking strength at normal temperature (23° C.) was low. In Comparative Example 7 in which the component (2) was not used in the intermediate layer, in Comparative Example 8 in which the content of the component (3) in the intermediate layer was large, and in Comparative Examples 10 and 11 in which materials that were not equivalent to the component (2) as defined by the present invention (having a small content of vinyl bonds) were used in the intermediate layer, flexibility, bag-breaking strength at a low temperature (4° C.), and transparency were all deteriorated.

On the other hand, in Examples 1 to 20 in which the resin composition (X) was used only for the intermediate layer, a laminate having satisfactory flexibility and transparency, high heat-seal strength, high bag-breaking strength at normal temperature (23° C.), high bag-breaking strength at a low temperature (4° C.), and low (inner layer)-(inner layer) adhesiveness, was obtained in all cases. Particularly, it is speculated that the bag-breaking strengths at 23° C. as well as 4° C. were significantly improved because cracks were propagated by the crack propagation mode A in all of the Examples.

In addition, in regard to the film-forming properties for which an evaluation was performed preliminarily, since the TPS5 used in the resin composition for the intermediate layer in Example 8 had a relatively high molecular weight, the laminate exhibited excellent results in the bag-breaking strength and the like; however, surging and foreign matters were all recognized under the present processing conditions. However, the laminates of other Examples exhibited satisfactory film-forming properties.

INDUSTRIAL APPLICABILITY

The liquid packaging container of the present invention can be used for various applications. For example, the liquid packaging container can be effectively utilized as a medical container as described above, as well as a food packaging container for packaging a retort food, mayonnaise, ketchup, a refreshing beverage, ice, or the like.

The invention claimed is:

1. A liquid packaging container comprising a laminate of at least three layers comprising an inner layer formed from a resin composition (Y); an intermediate layer formed from a resin composition (X); and an outer layer formed from a resin composition (Z):

wherein:
the resin composition (X) comprises 100 parts by mass of a polypropylene-based resin (1) having a content of a structural unit derived from a propylene monomer of 60 mol % or more; 5 parts by mass to 95 parts by mass of a thermoplastic elastomer (2) having a number average molecular weight of 20,000 to 500,000, the thermoplastic elastomer (2) being a thermoplastic elastomer obtained by hydrogenating a block copolymer comprising a polymer block (A) which comprises a structural unit derived from an aromatic vinyl compound as a main component and has a number average molecular weight of 2,500 to 100,000, and a polymer block (B) which comprises a structural unit derived from a conjugated diene compound as a main component and has a content of a vinyl bond structural unit of 50 mol % or more and a number average molecular weight of 10,000 to 300,000, the polymer block (B) comprising 80 mol % or more of carbon-carbon double bonds hydrogenated; and 10 parts by mass to 95 parts by mass of an ethylene-α-olefin copolymer (3) having a content of a structural unit derived from an ethylene monomer of 50 mol % to 95 mol %, the resin composition (Y) comprises 100 parts by mass of a polypropylene-based resin (1') having a content of a structural unit derived from a propylene monomer of 60 mol % or more; and 5 parts by mass to 250 parts by mass of a thermoplastic elastomer (2') comprising a polymer block which comprises a structural unit derived from an aromatic vinyl compound as a main component and a polymer block which comprises a structural unit derived from a conjugated diene compound as a main component, provided that an ethylene-α-olefin copolymer having a content of a structural unit derived from an ethylene monomer of 50 mol % to 95 mol % is not included or, if included, the content of the copolymer is less than 10 parts by mass, and the resin composition (Z) comprises 100 parts by mass of a polypropylene-based resin (1") having a content of a structural unit derived from a propylene monomer of 60 mol % or more; and 0 parts by mass to 35 parts by mass of a thermoplastic elastomer (2") comprising a polymer block which comprises a structural unit derived from an aromatic vinyl compound as a main component and a polymer block which comprises a structural unit derived from a conjugated diene compound as a main component.

2. The liquid packaging container according to claim 1, wherein the ethylene-α-olefin copolymer (3) has a melt flow rate under a condition of 230° C. and a load of 21.6 N, of 0.1 g/10 min to 30 g/10 min, and a melting point of 40° C. to 120° C.

3. The liquid packaging container according to claim 1, wherein the polypropylene-based resins (1), (1'), and (1") are each independently at least one selected from the group consisting of a homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, and a propylene-ethylene-hexene random copolymer.

4. The liquid packaging container according to claim 1, wherein the polypropylene-based resin (1') has a melting point of 120° C. to 140° C.

5. The liquid packaging container according to claim 1, wherein the polypropylene-based resin (1") is a homopolypropylene.

6. The liquid packaging container according to claim 1, wherein the thermoplastic elastomers (2') and (2") are each independently a thermoplastic elastomer obtained by hydrogenating a block copolymer comprising a polymer block (A) which comprises a structural unit derived from an aromatic vinyl compound as a main component and has a number average molecular weight of 2,500 to 100,000, and a polymer block (B) which comprises a structural unit derived from a conjugated diene compound as a main component and has a content of a vinyl bond structural unit of 50 mol % or more and a number average molecular weight of 10,000 to 300,000, the polymer block (B) comprising 80 mol % or more of carbon-carbon double bonds hydrogenated, and the thermoplastic elastomer has a number average molecular weight of 20,000 to 500,000.

7. The liquid packaging container according to claim 1, wherein thicknesses of the layers are in the ranges of 5 μm to 30 μm for the inner layer, 100 μm to 300 μm for the intermediate layer, and 15 μm to 120 μm for the outer layer.

8. A medical container comprising the liquid packaging container according to claim 1.

* * * * *